United States Patent Office 3,686,260
Patented Aug. 22, 1972

3,686,260
METHOD FOR PRODUCING AN ALICYCLIC DINITRILE
Goro Inoue, Tokyo, and Hirokazu Fukumi, Saitama-ken, Japan, assignors to Asahi Kasei Kogyo Kabushiki Kaisha, Kitaku, Osaka, Japan
No Drawing. Filed Sept. 2, 1969, Ser. No. 855,077
Claims priority, application Japan, Sept. 2, 1968, 43/62,347
Int. Cl. C07c *121/46*
U.S. Cl. 260—464                 12 Claims

ABSTRACT OF THE DISCLOSURE

Method for producing cyclohexane-1,2-dicarbonitrile from cyclohexene-1-carbonitrile and hydrocyanic acid at a temperature ranging from 120° C. to 200° C. in the presence of an inorganic base, as a catalyser.

---

This invention relates to a method for producing cyclohexane-1,2-dicarbonitrile. More particularly, this invention relates to a novel and economically advantageous method for producing cyclohexane-1,2-dicarbonitrile.

As for the conventional methods for producing cyclohexane-1,2-dicarbonitrile, there have been known those which rely on the dehydrogenation reaction of cyclohexane 1,2-dicarboxamide with phosgene (see: G. E. Ficken, J. Chem. Soc., 1954, 3730) and the reaction of cyclohexane-1,2-dibromide with hydrocyanic acid. (see: D. E. Applequist, J. Am. Chem. Soc. 28 48 (1963)). However, all of these methods are not economically advantageous in the points of reagents used, reaction yield and reaction condition. There has also been known a synthetic method of cyclohexane-1,2-dicarbonitrile which utilizes the addition of hydrocyanic acid generated by reacting concentrated hydrochloric acid with an excessive amount of potassium cyanide, to cyclohexene - 1-carbonitrile in a solvent mixture of ethanol and water under a superatmospheric pressure. (see: G. E. Ficken, J. Chem. Soc., 1954, 3730). However when hydrocyanic acid is heated under an elevated pressure in the presence of a large amount of water, it generally undergoes various reactions such as polycondensation or the like. Hence this method brings about a loss of large amount of hydrocyanic acid, deterioration of property of reaction solution accompanied by complexity of reaction operation, heavy loss of objective substance at the time of collection and isolation. So in the literatures relating to this process even the yield of the objective substance obtained is not described. Hence this method can by no means be said to have economical significance.

Accordingly, it is an object of the present invention to provide an economically efficient method for producing cyclohexane-1,2-dicarbonitrile which is an useful substance as a raw material of high molecular substance or an additive to a high molecular substance.

Other objects and advantages of the present invention will become apparent from the description which hereinunder follows.

According to the method of the present invention, cyclohexane-1,2-dicarbonitrile is produced by reacting cyclohexene-1-carbonitrile and hydrocyanic acid at a temperature ranging from 120° C. to 200° C. in the presence of an inorganic base, as a catalyst.

As previously described, the object of the present invention is a provision for a production method of cyclohexane-1,2-dicarbonitrile which is more economical and more advantageous than any other conventional methods ever known.

In the method of the present invention, the loss of large amount of hydrocyanic acid itself caused by polycondensation or the like, and economical loss concomitant with it are prevented perfectly by not allowing a substantial amount of water whose existence in the system adversely affects the reaction. It is possible to use a solvent in the present method. So far as organic solvent is concerned, any kind of it can be used but it is preferable that the solvent used be purified to common technical grade.

One feature of the present invention lies in the heating of the reactants at a temperature higher than 120° C. at the time of addition of hydrocyanic acid to cyclohexene-1-carbonitrile.

At a reaction temperature lower than 120° C., hydrocyanic acid cannot be added smoothly to cyclohexene-1-carbonitrile; hence such a low temperature reaction cannot be an economical and advantageous production method of cyclohexane-1,2-dicarbonitrile.

Namely under a condition which can be readily thought of from such a mild reaction condition as the addition reaction of hydrocyanic acid to general $\alpha,\beta$-unsaturated conjugated nitriles (see; CA 60 15700e), hydrocyanic acid cannot be added to cyclohexene-1-carbonitrile: hence it is necessary to heat the reactant up to about 120° C. to 200° C.

Another feature of the present invention is the use of metal cyanide as a catalyser. Heretofore it has been commonly recognized that metal cyanide does not act as a catalyser in this sort of reaction (see: G. E. Ficken, J. Chem. Soc., 1954, 3730).

However to be surprising enough, the metal cyanide performs a function of an excellent catalyst. In this regard, it can be said that the present invention is based upon this discovery of a novel fact.

In the practice of the present invention, a catalyser to be used is an inorganic base such as a metal carbonate, metal cyanide, and metal hydroxide. The metal cyanide referred to herein includes combined products of cyanide ion and various metals capable of joining with the cyanide ion ranging from general metal elements represented by lithium, potassium, sodium, tin, to transition metal elements represented by vanadium, chromium, copper, palladium, nickel or the like.

The metal hydroxide includes hydroxide of the above-mentioned metals and the metal carbonate includes compounds of the above-mentioned metal with carbonic acid. These catalysers can be used not only solely but also in the form of a mixture of two or more.

The amount of catalyser used is in the range of proportion of about $\frac{1}{1000}$–$\frac{1}{2}$ mol per mol of raw material, cyclohexene-1-carbonitrile, preferably in the range of proportion of about $\frac{1}{20}$–$\frac{1}{2}$.

When a solvent is used in the method of the present invention, there is no limitation as to the kind. All of general organic solvent can be used but it is necessary that it is in the state purified to technical grade in moisture content. It is also possible to add hydrocyanic acid directly to cyclohexene-1-carbonitrile to effect reaction particularly in the absence of a solvent.

In this case also, it is necessary that the reaction system does not contain such an extent of moisture as being harmful. There is no limitation as to the amount of solvent used.

As for the proportion of cyclohexene-1-carbonitrile and hydrocyanic acid at the time of reaction, the molar ratio of cyclohexene-1-carbonitrile: hydrocyanic acid can be in the range of from about 1:4 to 100:1.

However, in order to prevent the properties of reaction solution from being impaired, hydrocyanic acid from being lost and the objective substance from being lost in isolation, it is preferable to use a proportion in the range of 1:2 to 10:1. Further, it is necessary to add hydrocyanic acid more than the amount of catalyser used in molar ratio.

There is no special order of addition or mixing of the substances participating in each reaction. In other words, it is possible to bubble hydrocyanic acid through a mixture containing necessary amount of catalyser, cyclohexene-1-carbonitrile, if necessary a solvent at a temperature properly controlled. Alternatively, it is possible to bubble hydrocyanic acid through an appropriate solvent and then to add cyclohexene-1-carbonitrile, and a catalyst without regarding the order to complete reaction.

For the purpose of isolation of the objective product, any means which enables to attain the object can be used, but in the point of operation, a distillation method is simple and most frequently used.

Cyclohexane-1,2-dicarbonitrile thus obtained is a mixture of cis and trans isomers.

The present invention is further illustrated by the following non-limitative examples.

53.3 g. of cyclohexene-1-carbonitrile, 13.5 g. of hydrocyanic acid, 6.35 g. of sodium cyanide and 200 ml. of N,N'-dimethyl formamide were held in an autoclave at a temperature of 160° C. for 3 hours. After cooling, a slightest amount of remaining hydrocyanic acid was eliminated by aeration. After filtration of sodium cyanide, the filtrate was subjected to a fractional distillation under a reduced pressure whereby 61.0 g. of cyclohexane-1,2-dicarbonitrile (B.P. 120–155° C. at 2–5 mm. Hg) was obtained.

The elemental analysis of resultant product after redistillation showed the result of C:71.61, H:7.5,1, N:20.88% (theoretical value: C:71.60, H:7.51, N:20.89%). The IR spectra of the product showed an absorption band of CN at 2240 cm.$^{-1}$ and the NMR spectra showed the presence of 2 protons at $\tau$7.05–6.91, and 8 protons at $\tau$8.15–8.31.

The same procedures were repeated by using different catalyst, solvent, reaction temperature and reaction time, the result of which are shown in the following table.

the group of metal cyanide; metal carbonate; metal hydroxide; wherein the metal portion of said cyanide, carbonate, and hydroxide is selected from the group of alkali metal, tin, vanadium, chromium, copper, palladium, and nickel; cobalt carbonate; calcium carbonate; and mixtures thereof; wherein the molar ratio of cyclohexene-1-carbonitrile to hydrocyanic acid is in the range from about 1:4 to about 100:1, wherein the mole ratio of the catalyst to said cyclohexene-1-carbonitrile is in the range of about 1:1,000 to 1:2, and wherein the mole ratio of the hydrocyanic acid to the catalyst is greater than 1.

2. The method of claim 1 wherein the reaction is carried out in the absence of a solvent.

3. The method of claim 1 wherein the reaction is carried out in the presence of a solvent.

4. The method of claim 1 wherein the catalyst is a metal cyanide.

5. The method of claim 1 wherein said catalyst is a metal carbonate.

6. The method of claim 1 wherein said catalyst is a metal hydroxide.

7. The method of claim 1 wherein the mole ratio of cyclohexene-1-carbonitrile to hydrocyanic acid is 1:less than 1.

8. The method of claim 2 wherein the mole ratio of cyclohexene-1-carbonitrile to hydrocyanic acid is 1:less than 1.

9. The method of claim 1 wherein the hydrocyanic acid is bubbled through a mixture containing the catalyst and cyclohexene-1-carbonitrile.

10. The method of claim 3 wherein the hydrocyanic acid is bubbled through a solvent and the cyclohexene-1-carbonitrile and catalyst are added to the solvent.

11. The method of claim 1 wherein the molar ratio of cyclohexene-1-carbonitrile to hydrocyanic acid is in the range of 1:2 to 10:1.

12. The method of claim 3 wherein said solvent is selected from the group of N,N'-dimethyl formamide, N,N'-dimethyl acetamide, and dimethyl sulfoxide.

| Raw material (g.) | | Catalyst used and its amount (g.) | Solvent used and its amount (ml.) | Reaction temp (°C.) | Reaction time (hrs.) | Collected and recovered product (g.) | |
|---|---|---|---|---|---|---|---|
| Cyclohexene-1-carbonitrile | Hydrocyanic acid | | | | | Cyclohexane-1,2-dicarbonitrile | Cyclohexene-1-carbonitrile |
| 50.3 | 13.5 | KCN, 3.3 | DMF | 140 | 5 | 61.0 | |
| 50.3 | 1.35 | Pd(CN)$_2$, 0.80 | DMF, 25 | 180 | 10 | 5.7 | |
| 50.3 | 2.70 | NaCN, 2.45 | DMF, 100 | 160 | 4 | 12.0 | 40.0 |
| 50.3 | 6.70 | NaCN, 9.80 | DMSO, 200 | 120 | 10 | 32.5 | 24.5 |
| 50.3 | 13.5 | Ni(CN)$_2$, 15.0 | EtOH, 200 | 120 | 20 | 60.0 | |
| 50.3 | 13.5 | NaCN, 12.7 | CH$_3$CN, 200 | 130 | 5 | 60.0 | |
| 50.3 | 2.7 | NaCN, 2.5 | | 160 | 4 | 11.0 | 37.0 |
| 50.3 | 16.5 | NaOH, 4.0 | DMF, 200 | 160 | 3 | 61.0 | |
| 50.3 | 16.5 | CaCO$_3$, 3.7 | DMF, 200 | 180 | 4 | 59.0 | |
| 50.3 | 16.5 | K$_2$CO$_3$, 6.9 | DMAC, 200 | 140 | 6 | 62.0 | |
| 50.3 | 4.1 | CaCO$_3$, 5.0 | CH$_3$CN, 200 | 120 | 7 | 6.5 | 44.0 |
| 50.3 | 16.5 | CoCO$_3$, 2.8 | DMF, 200 | 160 | 4 | 58.0 | |
| 50.3 | 5.4 | H$_2$CO$_3$, 3.5 | | 140 | 4 | 17.0 | 35.0 |

DMF: N,N'-dimethyl formamide, DMAC: N,N'-dimethyl acetamide, DMSO: N.N'-dimethyl sulfoxide.

What is claimed is:

1. A method for producing cyclohexane-1,2-dicarbonitrile which comprises reacting cyclohexene-1-carbonitrile with hydrocyanic acid at a temperature of 120° C. to 200° C., in the substantial absence of water in the reaction system, and in the presence of a catalyst selected from

References Cited

UNITED STATES PATENTS 2,698,337  12/1954  Heider et al. _____ 260—464
2,904,581   9/1959  Coraor et al. _____ 260—464 X JOSEPH PAUL BRUST, Primary Examiner